United States Patent
Agarwal

(10) Patent No.: US 12,301,945 B2
(45) Date of Patent: May 13, 2025

(54) SYSTEMS AND METHODS FOR MEDIA STREAMING APPLICATION INTERACTING WITH A SOCIAL NETWORK

(71) Applicant: Discovery.com, LLC, New York, NY (US)

(72) Inventor: Rahul Agarwal, Isleworth (GB)

(73) Assignee: Discovery.com, LLC, New York, NY (US)

( * ) Notice: Subject to any disclaimer, the term of this patent is extended or adjusted under 35 U.S.C. 154(b) by 0 days.

(21) Appl. No.: 17/587,200

(22) Filed: Jan. 28, 2022

(65) Prior Publication Data

US 2023/0247259 A1    Aug. 3, 2023

(51) Int. Cl.
| | |
|---|---|
| *H04N 21/4788* | (2011.01) |
| *H04N 21/422* | (2011.01) |
| *H04N 21/45* | (2011.01) |
| *H04N 21/466* | (2011.01) |

(52) U.S. Cl.
CPC ..... *H04N 21/4788* (2013.01); *H04N 21/4221* (2013.01); *H04N 21/4532* (2013.01); *H04N 21/4668* (2013.01)

(58) Field of Classification Search
CPC ........... H04N 21/4788; H04N 21/4221; H04N 21/4532; H04N 21/4668
See application file for complete search history.

(56) References Cited

U.S. PATENT DOCUMENTS

| | | | |
|---|---|---|---|
| 9,628,575 B1 * | 4/2017 | Lewis | H04N 21/812 |
| 9,811,514 B1 * | 11/2017 | Lewis | H04L 65/403 |
| 2006/0173838 A1 * | 8/2006 | Garg | G06Q 30/02 |
| | | | 707/999.005 |
| 2009/0100469 A1 * | 4/2009 | Conradt | H04N 21/4788 |
| | | | 725/46 |
| 2012/0030586 A1 * | 2/2012 | Ketkar | H04N 21/4532 |
| | | | 715/751 |
| 2012/0274863 A1 * | 11/2012 | Chardon | G06F 16/65 |
| | | | 348/734 |
| 2013/0268973 A1 * | 10/2013 | Archibong | G06Q 50/01 |
| | | | 709/204 |
| 2013/0311561 A1 * | 11/2013 | Ku | G11B 27/34 |
| | | | 709/204 |
| 2014/0280571 A1 | 9/2014 | Tarbox et al. | |

(Continued)

*Primary Examiner* — Michael R Telan
(74) *Attorney, Agent, or Firm* — Bookoff McAndrews, PLLC

(57) ABSTRACT

Systems and methods for optimizing interactions with a media-streaming application platform are disclosed. One method includes identifying a user of a media-streaming application platform running on an information handling device. Based on this identification, a user profile associated with one or more social media platforms linked to the media-streaming application platform may be accessed. Media-related activity data from at least one other individual on the social media platform(s) may be obtained. Thereafter, a determination may be made whether one or more articles of media content available to the media-streaming application platform are associated with the media-related activity of the other individuals. Responsive to identifying that a positive association exists, one or more recommendation rails may be presented on the media-streaming application platform. Other aspects are described and claimed.

20 Claims, 9 Drawing Sheets

(56) References Cited

U.S. PATENT DOCUMENTS

| | | | |
|---|---|---|---|
| 2014/0317660 A1* | 10/2014 | Cheung | H04N 21/4316 |
| | | | 725/38 |
| 2015/0067061 A1* | 3/2015 | Poston | H04L 67/306 |
| | | | 709/204 |
| 2015/0067724 A1* | 3/2015 | Johnson | H04N 21/4668 |
| | | | 725/32 |
| 2016/0142783 A1* | 5/2016 | Bagga | H04N 21/47214 |
| | | | 725/47 |
| 2016/0255163 A1* | 9/2016 | Stathacopoulos | H04L 67/535 |
| | | | 709/224 |
| 2017/0187770 A1* | 6/2017 | Paul | H04N 21/8456 |
| 2018/0152759 A1* | 5/2018 | Miller | G06F 16/2455 |
| 2018/0349281 A1* | 12/2018 | Lee | H04N 21/4184 |
| 2019/0075340 A1* | 3/2019 | Hochart | H04L 51/02 |
| 2020/0068262 A1* | 2/2020 | Saldana | H04N 21/8173 |
| 2020/0107074 A1* | 4/2020 | Aggarwal | H04N 21/4788 |
| 2022/0027776 A1* | 1/2022 | Trenkle | H04N 21/4826 |

* cited by examiner

SYSTEMS AND METHODS FOR MEDIA STREAMING APPLICATION INTERACTING WITH A SOCIAL NETWORK

TECHNICAL FIELD

The present disclosure relates generally to the field of multimedia streaming and, more particularly, to systems and methods for a media-streaming application platform interacting with a social network.

BACKGROUND

Individuals may access and interact with an array of digital media content on their information handling devices ("devices"), e.g., smart phones, tablet devices, laptops and/or personal computers, smart televisions, and the like. For example, an individual may utilize a media streaming application resident on their phone, computer, and/or TV to obtain access to various over-the-top (OTT) services and/or subscription-based video-on-demand (SVoD) services such as television shows, films, documentaries, and the like. It is common for individuals to share their impressions of current or recently viewed media content with others (e.g., friends, family, others in the individuals' social media sphere, etc.) via one or more social networks. Additionally, media recommendations from others may influence an individual's content viewing selection. The present disclosure is accordingly directed to optimizing these and other aspects associated with existing digital media content delivery systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In summary, one aspect provides a method of interacting with a media-streaming application platform, the method including: identifying, utilizing user identification data, a user of the media-streaming application platform running on an information handling device; accessing, based on the identifying, a user profile of the user that is associated with at least one social media platform linked to the media-streaming application platform; obtaining, from the user profile, media-related activity data from at least one other individual associated with the user on the at least one social media platform; determining, using the media-related activity data, one or more articles of media content available on the media-streaming application platform that are associated with the media-related activity data; and presenting, on the media-streaming application platform, at least one recommendation rail comprising the one or more articles of media content.

Another aspect provides an information handling device, including: one or more computer readable media storing instructions for interacting with a media-streaming application platform; and one or more processors configured to execute the instructions to perform operations comprising: identifying, utilizing user identification data, a user of the media-streaming application platform running on the information handling device; accessing, based on the identifying, a user profile of the user that is associated with at least one social media platform linked to the media-streaming application platform; obtaining, from the user profile, media-related activity data from at least one other individual associated with the user on the at least one social media platform; determining, using the media-related activity data, one or more articles of media content available on the media-streaming application platform that are associated with the media-related activity data; and presenting, on the media-streaming application platform, at least one recommendation rail comprising the one or more articles of media content.

A further aspect provides a non-transitory computer-readable medium storing instructions for interacting with a media-streaming application platform, the instructions, when executed by one or more processors, causing the one or more processors to perform operations including: identifying, utilizing user identification data, a user of the media-streaming application platform; accessing, based on the identifying, a user profile of the user that is associated with at least one social media platform linked to the media-streaming application platform; obtaining, from the user profile, media-related activity data from at least one other individual associated with the user on the at least one social media platform; determining, using the media-related activity data, one or more articles of media content available on the media-streaming application platform that are associated with the media-related activity data; and presenting, on the media-streaming application platform, at least one recommendation rail comprising the one or more articles of media content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
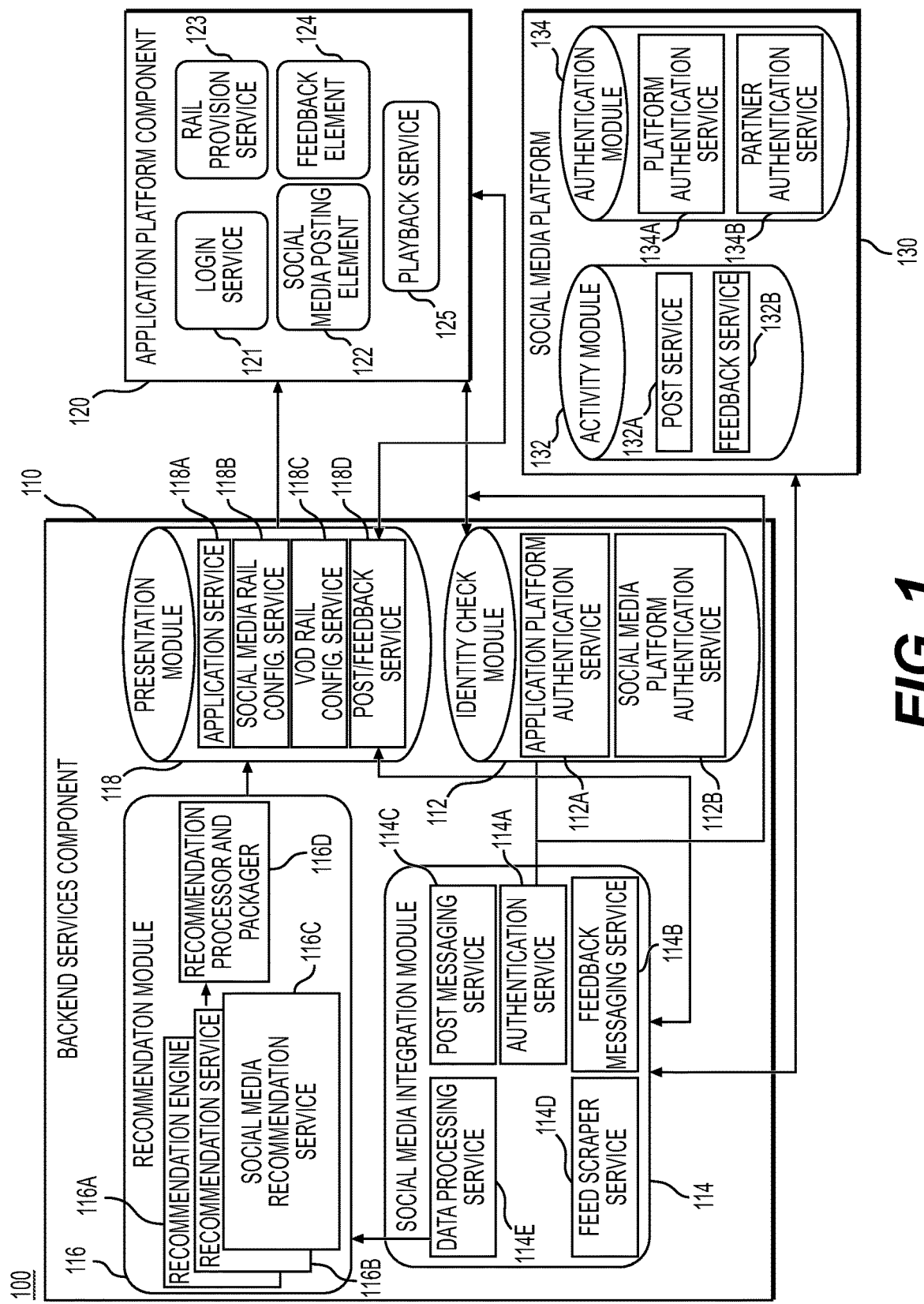
FIG. 1 depicts a block diagram of an exemplary media content delivery system, according to one aspect of the present disclosure.

The following embodiments describe systems and methods for optimizing interactions with a media-streaming application platform. More particularly, the embodiments contemplated in the present disclosure may provide a user with curated content recommendations and may also directly transmit a user's comments and impressions associated with viewed media content to one or more social media platforms connected to the media-streaming application platform.

Media consumption in the modern age is a much more involved experience than in times past. More particularly, far from simply viewing an article of media content (e.g., a television show, a movie, a sporting event, a documentary, etc.), many individuals enjoy sharing their impressions and/or discussing aspects of viewed content with others. This sharing is largely facilitated by interactions with one or more social media platforms an individual is subscribed to (e.g., FACEBOOK, TWITTER, INSTAGRAM, etc.). Specifically, an individual may communicate their impressions of viewed content to others by posting a message, updating a status, sharing an image or video clip, and the like. Likewise, many individuals desire to be keyed in to the types of media content that are popular amongst their social contacts (e.g., family, friends, and/or others in the individuals' social sphere (e.g., individuals with similar demographics, such as education level, age, location, residence, income, etc.)). FACEBOOK is a registered trademark of Facebook, Inc. in the United States and other countries. TWITTER is a registered trademark of Twitter, Inc. in the United States and other countries. INSTAGRAM is a registered trademark of Instagram, LLC in the United States and other countries.

Conventionally, an individual may glean information regarding the viewing habits of their social contacts by directly communicating with those contacts and/or by examining their social media profiles. However, neither of these techniques is particularly effective at providing the individual with an accurate and up-to-date representation of these viewing habits in the form of content viewing recommendations. More particularly, an individual would need to have many conversations and/or may need to analyze many social media feeds in order to get some consensus regarding which articles of media are popular amongst their social contacts. Such a process is not only time-consuming but, if the process is not frequently repeated, will be inaccurate because viewing habits change frequently (i.e., as new media content is made available to stream).

Additionally, conventional media-streaming platforms can sometimes make it inconvenient for a user to share their impressions of viewed content with others. For example, existing systems may sometimes require a user to close, minimize, and/or otherwise look away from the media-streaming application platform to interact with a social media platform (e.g., which may be located in another window on the user's device, which may be located on another device than the one hosting the media-streaming application platform, etc.). Such a feature may disrupt an individual's viewing experience and may be time-consuming and burdensome, especially if the individual wants to share their impressions on multiple social media platforms.

To address the above-noted problems, the present disclosure describes a media content delivery (MCD) system that can provide curated recommendations to a user based on the activity of others in their social sphere. Additionally, the MCD system may allow users to seamlessly post to their social media accounts, and receive reactions thereto, from within the media-streaming application platform. For example, a backend services component, an application platform component, and a social media platform component may communicate and work in unison with one another to achieve the foregoing benefits.

In one embodiment, the MCD system of the present disclosure may identify a user of a media-streaming application (MSA) platform. More particularly, an identity check module of the backend services component may verify the identity of the user and may also sign the user into one or more of their social media accounts that are linked to the MSA platform. A social media integration module of the backend services component may integrate with each linked social media platform to interface, interact, and ultimately glean social media data corresponding to the viewing activities of others in the user's social sphere. This data may then be transmitted from the social media integration module to a recommendation module of the backend services component for processing and packaging. The processed and packaged content is then relayed to a presentation module, which is responsible for, inter alia, providing one or more lists of content viewing recommendations (i.e., rails) to a user on the MSA platform. Additionally, the presentation module may also receive and process input provided by the user and post that input onto one or more selected social media platforms. Any detected reactions others have to the posted content may subsequently be relayed back to the presentation module (i.e., via the social media integration module and the recommendation module) and provided to the user on the MSA platform.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary media content delivery (MCD) system 100 including a backend services component 110, an application platform component 120, and a social media platform 130. Each of the foregoing components may be resident on a single device (e.g., a user's device, etc.) or, alternatively, some or each of the foregoing components may be resident on different devices or servers. Additionally, each of the foregoing components may be in communication with some or all of the other components directly, indirectly, and/or via a network (e.g., the Internet and/or one or more cloud networks).

In one embodiment, an application platform component 120 may be resident on a user's device. The application platform component 120 may come preprogrammed on the user's device (e.g., by the device manufacturer) or, alternatively, may be downloaded onto the device by the user (e.g., from an application store, etc.). In an embodiment, the application platform component 120 may manifest on the user's device as a media-streaming application that is configured to provide, by a playback element 125, various types of live and/or on-demand digital media content (e.g., television shows, films, documentaries, etc.). Indications of available content may be presented to the user in the form of one or more content recommendation lists, or "rails." In an embodiment, the application platform component 120 may contain additional functionality that enables a user to post, via a social media posting element 122, content to a social media platform and receive, via a feedback element 124, reactions/feedback to the content from others. Additional details regarding services and elements 122, 123, and 124 are later described herein.

Prior to accessing the digital media content provided by the application platform component 120, and other functionality associated therewith, a user must first be verified as an authorized user and granted access to a corresponding user profile. In an embodiment, the application platform component 120 may be linked to a backend services component 110, and more specifically to an identity check module 112. The identity check module 112 may be configured to run various identity-related services, including an application platform authentication service 112a and a social media platform authentication service 112b. With respect to the former, the application platform authentication service 112a may ensure that a user is correctly authenticated and that all necessary authorizations are applied to their account. In an embodiment, the application platform authentication service 112a may transmit controlling instructions to the application platform component 120 to facilitate the identity verification process. Identity data subsequently received by the application platform component 120 may then be transmitted back to the application platform authentication service 112a for processing. Alternatively, the data processing may occur at the application platform component 120 and/or at the user's device and a result associated therewith may be communicated back to the application platform authentication service 112a.

In an embodiment, the identity verification process may be facilitated in one or more different ways. For instance, the application platform component 120 may prompt, via a login service 121, a user to provide identification input. Possible types of user-provided identification inputs may include, but are not limited to: a username/password key pair provided to one or more input fields of a login screen of the application platform component 120 (e.g., provided via touch input, stylus input, keyboard input, remote control input, etc.), a predetermined audible input phrase detected by one or more audio capture devices (e.g., microphones, etc.) associated with the user's device, a predetermined gesture input detected by one or more camera sensors associated with the user's device, and any combination of the foregoing. Additionally or alternatively to the foregoing, in yet another example, the application platform authentication service 112a may attempt to determine a user's identity dynamically (i.e., without receipt of any explicit user-provided identification input). For instance, an embodiment may leverage one or more microphone or camera sensors on the user's device to capture user characteristic data (e.g., user voice data, user facial feature data, a combination thereof, etc.) that may then be processed as further described herein.

In an embodiment, the application platform authentication service 112a may receive the user identification data and determine whether it corresponds to an existing user profile of the application platform component 120. For example, the application platform authentication service 112a may compare the received user-provided identity information against a listing of login credentials stored in an accessible database, wherein each of the login credentials in the listing is associated with a previously established user profile. Responsive to identifying a match between the user identification information and a specific profile in the database, an embodiment may grant the user access to their user profile on the application platform component 120. In a similar embodiment, the application platform authentication service 112a may compare the received user characteristic data against a listing of previously established user characteristics (e.g., established during a training phase of the user profile creation, etc.). Responsive to identifying that a predetermined threshold level of similarity exists between the user characteristic data and the previously established user characteristics (e.g., at least fifty percent similarity, at least seventy-five percent similarity, substantially one-hundred percent similarity, etc.), an embodiment may grant the user access to their user profile on the application platform component 120.

Once access is granted to the user profile, a user may be directed to an application homepage of the application platform component 120. On this homepage, a user may be presented, via a rail provision service 123, with one or more rails of content recommendations. In an embodiment, each available rail may be associated with a particular category. For example, with reference to FIG. 2, an exemplary home screen 200 of an application platform component 120 is illustrated. The home screen 200 contains three rails, i.e., 202, 204, and 206, each of which is associated with a unique category. Specifically, rail 202 contains a multitude of content recommendations (i.e., 202a, 202b, 202c, etc.) for articles of media content that are generally popular on the application platform, rail 204 contains a multitude of content recommendations (i.e., 204a, 204b, 204c, etc.) for articles of media content that are popular among a user's family and close friends, and rail 206 contains a multitude of content recommendations (i.e., 206a, 206b, 206c, etc.) for articles of media content that are popular among others in the user's social sphere (i.e., a user's "friends", "contacts", "connections", "followers", etc., on one or more social media platforms).

Figure 2:
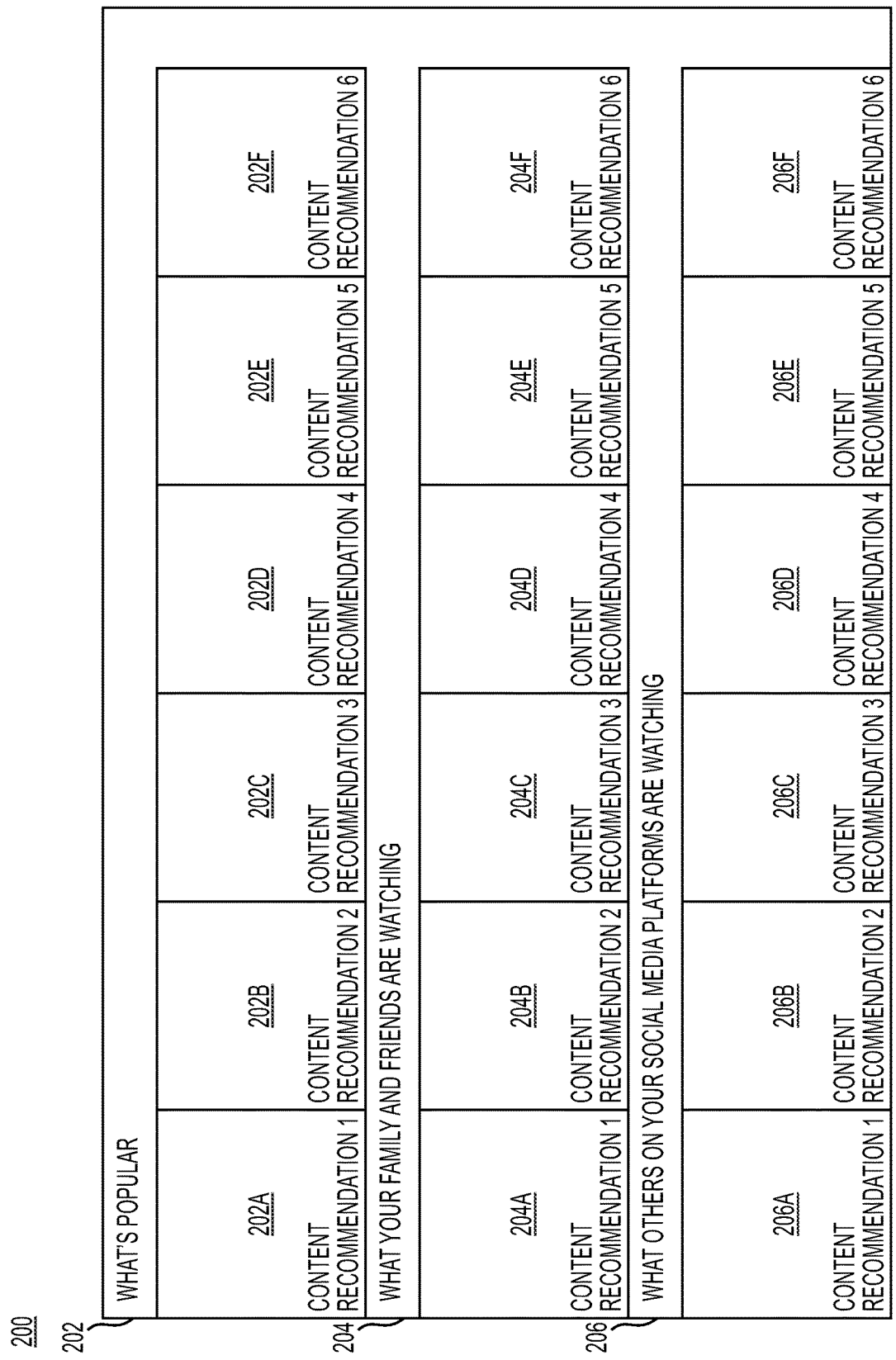
FIG. 2 depicts a user interface of an application platform associated with an exemplary media content delivery system, according to one aspect of the present disclosure.

It is important to note that although only three rails are illustrated in FIG. 2, such a designation is not limiting. More particularly, virtually any number of rails may exist, each of which may be associated with a unique category. For instance, one rail may provide content recommendations for articles of media content that are popular amongst a user's colleagues at work or classmates at school/university, another rail may provide content recommendations for articles of media content that are popular amongst individuals located in the same geographic region as the individual, and yet another rail may provide content recommendations for articles of media content that are popular amongst other individuals in the same professional field as the user (e.g., articles of media content that are popular amongst engineers, teachers, doctors, police officers, etc.). The number of available rails may be limited by user preference and/or by the amount of data that may be gleaned from social media and/or other sources.

To generate the rails, the MCD system 100 requires access to a user's available social media platforms. To facilitate this access, a social media platform authentication service 112b of the identity check module 112 may interface with one or more available social media platforms 130 through a social media integration module 114. In an embodiment, the social media platform authentication service 112b may sign the user in to their social media accounts (i.e., via information exchange with the social media platforms 130) and may also ensure that the social media account authorizations are securely maintained to avoid any nefarious account activity by bad actors. It is important to note that although FIG. 1 only illustrates one social media platform 130, such a provision is not intended to be limiting and virtually any number of social media platforms 130 may be linked to the application platform component 120 via the backend services component 110.

In an embodiment, the social media integration module 114 may integrate with each available social media platform 130. With respect to account access, an authentication service 114a of the social media integration module 114 may exchange authentication information with a platform authentication service 134a and a partner authentication service 134b of an authentication module 134 of the social media platform 130. More particularly, the authentication service 114a may transmit login credentials (e.g., a username/password pair entered by a user each time they initiate the MSA platform, a username/password pair saved in a database and automatically transmitted to the social media platform 130 upon MSA platform initiation, etc.) to the authentication module 134 for verification. Responsive to verifying the user's login credentials (e.g., by comparing the received login credentials to stored credentials associated with an authorized user, etc.), an embodiment may log the user into their social media account on the respective social media platform. Conversely, if the user's login credentials could not be verified, a notification may be provided to the user on the MSA platform that login has failed and an embodiment may request a user to re-enter the login credentials for the relevant social media platform manually.

Still referring to FIG. 1, once access to at least one social media platform 130 has been achieved, activity data of individuals in the user's social sphere may be obtained. To facilitate this process, a feed scraper service 114d may work in unison with a data processing service 114e to monitor a user's social media feed (e.g., the content presented to the user on their social media homepage) to identify indications of the viewing habits of others. In one embodiment, the feed scraper service 114d may capture all data present on the user's social media feed and then feed the captured data to the data processing service 114e for filtering. More particularly, the data processing service 114e may be configured to monitor the received media feed contents for predetermined triggers (e.g., specific words or phrases, images, videos, URLs, etc.) and filter out content that does not contain one or more of these triggers. For example, the data processing service 114e may monitor for: specific generic words (e.g., "movie", "film", "theater", "show", "series", etc.), specific nouns (e.g., the names of specific shows or movies, the names of specific production companies, the names of specific actors or actresses, the names of specific media-streaming application platforms, etc.), specific image content (e.g., show or movie posters, screen captures from a show or movie, images of an actor or actresses, a humorous media-related image such as a "meme", etc.), specific video content (e.g., a show or movie trailer, a cast interview video, a review video, etc.), specific URL links (e.g., an embedded link to a show or movie fan page, etc.), any combination of the foregoing, and the like.

The social media feed data filtered by the data processing service 114e may then be transmitted to the recommendation module 116. In an embodiment, a recommendation engine 116a, a recommendation service 116b, and a social media recommendation service 116c may work in unison to associate the filtered social media feed data with specific category types (e.g., action/adventure, romance, comedy, horror, etc.) and/or to identify specific articles of media content (i.e., specific shows or movies) referenced in the social media posts. The cumulative associations and identifications may thereafter be aggregated by a recommendation processor and packager 116d and subsequently transmitted to a presentation module 118. In an embodiment, the presentation module 118 may provide all the functionality to the application platform component 120 that enables the user to effectively interact and consume content on the MSA platform. In particular, an application service 118a may provide the user with functionality associated with account information, playback select, bookmarks, and virtually all other aspects of over-the-top (OTT) application functionality.

In an embodiment, the packaged data constructed by the recommendation processor and packager 116d may be formalized into one or more content recommendation rails, as illustrated in FIG. 2, by the social media rail configuration service 118b and the video-on-demand (VOD) rail configuration service 118c. With respect to the former, the social media rail configuration service 118b may construct one or more curated rails based on the analyzed data from one or more linked social media feeds in view of what is available in a media library associated with the MCD system 100. More particularly, these rails may contain media content that is directly referenced or implied to have been viewed by individuals in the user's social sphere. Non-limiting examples of possible rails that may be constructed by the social media rail configuration service 118b include: general media content recently viewed (e.g., in the past week, month, etc.) by others in the user's social sphere, categorized content recently viewed by others in the user's social sphere (e.g., rails composed of drama-related content, rails composed of reality TV show content, rails composed of cartoon content, etc.), more curated rails associated with specific groups of connections (e.g., rails composed of media content viewed by a user's classmates/colleagues, rails composed of media content viewed by geographically proximate connections, rails composed of media content viewed by others in the user's professional field, etc.), and other types of curated rails not explicitly mentioned here. With respect to the latter, the VOD rail configuration service 118c may construct one or more rails based on the activity of other users of the MSA platform (e.g., rails composed of generally popular content on the MSA platform, rails composed of content associated with specific categories, etc.). All of the constructed rails may then be transmitted to the application platform component 120 to be presented, via the rail provision service 123, as rails on a home screen of the MSA platform.

Figure 3:
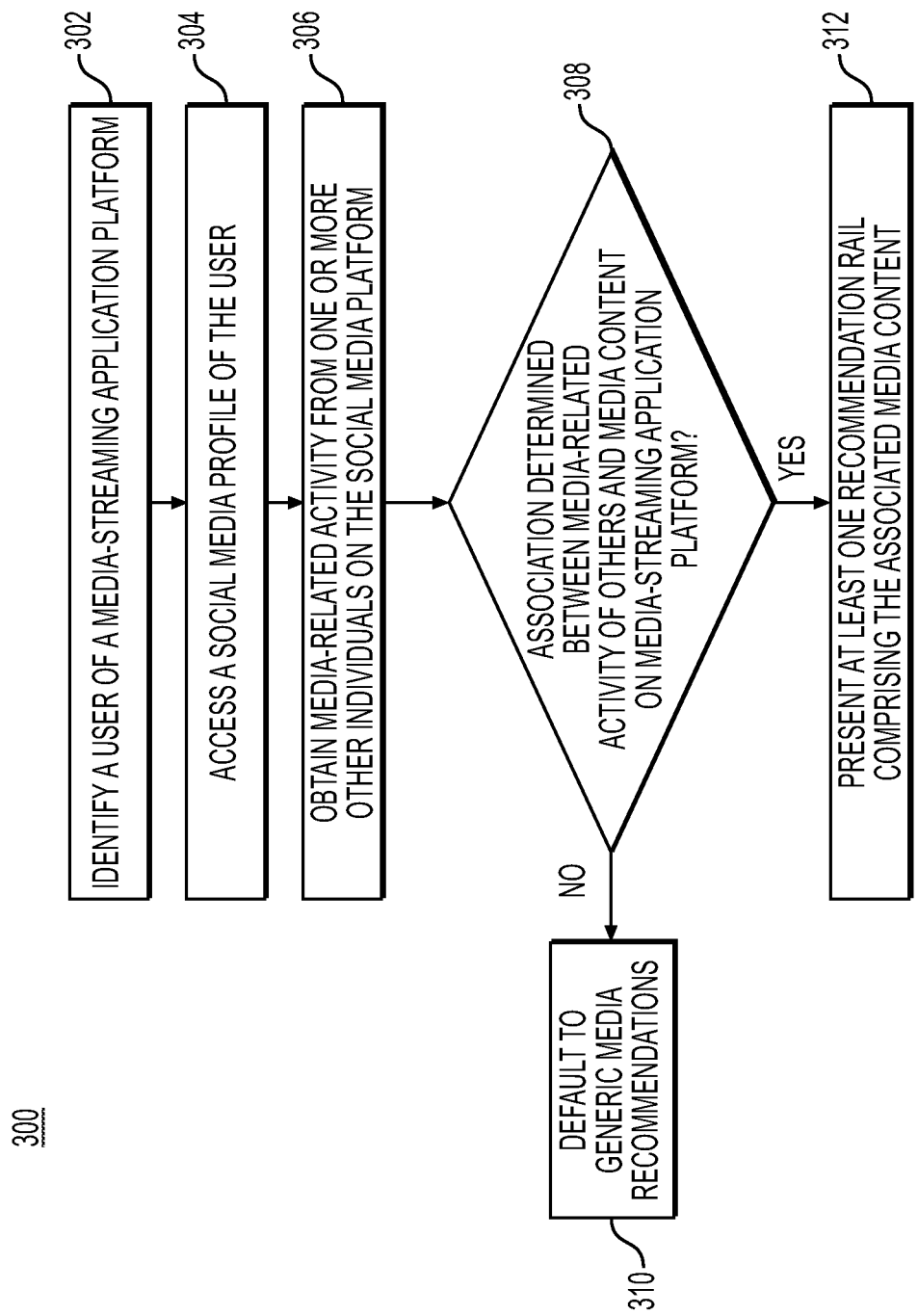
FIG. 3 illustrates a flowchart of an exemplary method of providing a recommendation rail to a user, according to one aspect of the present disclosure.

Turning now to FIG. 3, a flowchart is illustrated of an exemplary method 300 of providing at least one content recommendation rail to a user of the MSA platform. Exemplary process flows of the method 300, performed in accordance with the system 100 above, and with reference to the illustration provided in FIG. 2, are described hereinafter.

At step 302, the MCD system 100 may identify a user of an MSA platform. In an embodiment, this identification may be facilitated by the application platform authentication service 112a of the identity check module 112. More particularly, an embodiment may compare user-provided identification input (e.g., a username/password key pair, predetermined audible input word or phrase, predetermined gesture, etc.) to stored data associated with one or more authorized user. Alternatively, the application platform authentication service 112a may identify a user dynamically, without receiving any type of user-provided identification input. More particularly, an embodiment may utilize one or more sensors integrally or operatively coupled to a device hosting the MSA platform to capture characteristic data of the user. This captured characteristic data may then be compared to stored characteristic data of one or more authorized users to determine the user's identity.

At step 304, one or more user profiles associated with one or more social media platforms may be accessed by the MCD system 100. In an embodiment, a social media platform authentication service 112b of the identity check module 112 may interface with one or more available social media platforms 130 through a social media integration module 114. This interfacing may involve the exchanging of authentication information via an authentication service 114a of the social media integration module 114 with a platform authentication service 134a and partner authentication service 134b of an authentication module of a social media platform 130. In an embodiment, the social media authentication process may be initiated upon user request or, alternatively, may be initiated automatically in response to detection of a predetermined event (e.g., activation of the user device, activation of the MSA platform, etc.).

At step 306, an embodiment may glean media-related activity data from one or more other individuals on the social media platform 130. In an embodiment, a feed scraper service 114d may work in unison with a data processing service 114e to monitor a user's social media feed and capture activity data. In this regard, the feed scraper service 114d may monitor for predetermined triggers (e.g., words, phrases, images, videos, URL links, etc.) in posts appearing on the social media feed that may provide an indication of the viewing habits others. In an embodiment, the feed scraper service 114d may be configured to monitor and capture activity data on the social media platform 130 continuously, at predetermined intervals (e.g., each hour, each day, etc.), or in response to predetermined events (e.g., each time the MSA platform is initiated, etc.).

At step 308, an embodiment may attempt to determine an association between media-related activity data obtained from the social media platform 130 and media content available to the MCD system (e.g., on-demand media content stored in an accessible database, etc.). More particularly, an embodiment may attempt to identify whether the exact media content (e.g., the exact show, the exact film, etc.) that is referenced in the collected social media data is available to the MCD system 100 (e.g., in a media content database, etc.) and/or may attempt to determine whether the MCD system 100 has access to media content of the same or similar category as that content referenced in the collected social media data. This process may be facilitated by the recommendation module 116 and all of the components therein (i.e., the recommendation engine 116a, the recommendation service 116b, the social media recommendation service 116c, and the recommendation processor and packager 116d).

In an embodiment, if an association cannot be determined, at step 308, between obtained media-related activity data and available media content on the MCD system 100, then an embodiment may, at step 310, provide, via the VOD rail configuration service 118c, conventional content rail recommendations to the application platform component 120 (e.g., a rail corresponding to the most commonly viewed content on the MSA platform, etc.). Conversely, if an association can be determined, at step 308, an embodiment may construct and present, at step 312, one or more content recommendation rails associated with the media-related activity data. In an embodiment, the rails may be constructed at a social media rail configuration service 118b and may thereafter be transmitted to the application platform component 120 to be presented to the user (e.g., on a homepage).

Referring again to FIG. 1, a user may choose to interact with presented media content (e.g., a show or movie presented via the playback service 125 on the application platform component 120). More particularly, a user may choose to post their comments and/or reactions associated with a specific article of presented media content directly onto one or more social media platforms 130 from the MSA platform. To facilitate this process, a social media posting element 122 of the application platform component 120 may transmit any content posts from the user to a post/feedback service 118d of the presentation module 118 in the backend services component 110. The post-feedback service 118d may relay the content post to a post messaging service 114c of the social media integration module 114, which may thereafter transmit the content post to a post service 132a of the activity module 132. The post service 132a may ultimately post the user's content post onto the social media feed of the social media platform 130. In this way, a user does not need to open a separate application to post their content on (i.e., a dedicated social media platform application) nor do they need to close, minimize, or otherwise disengage from the application platform component 120 to do so.

Figure 4:
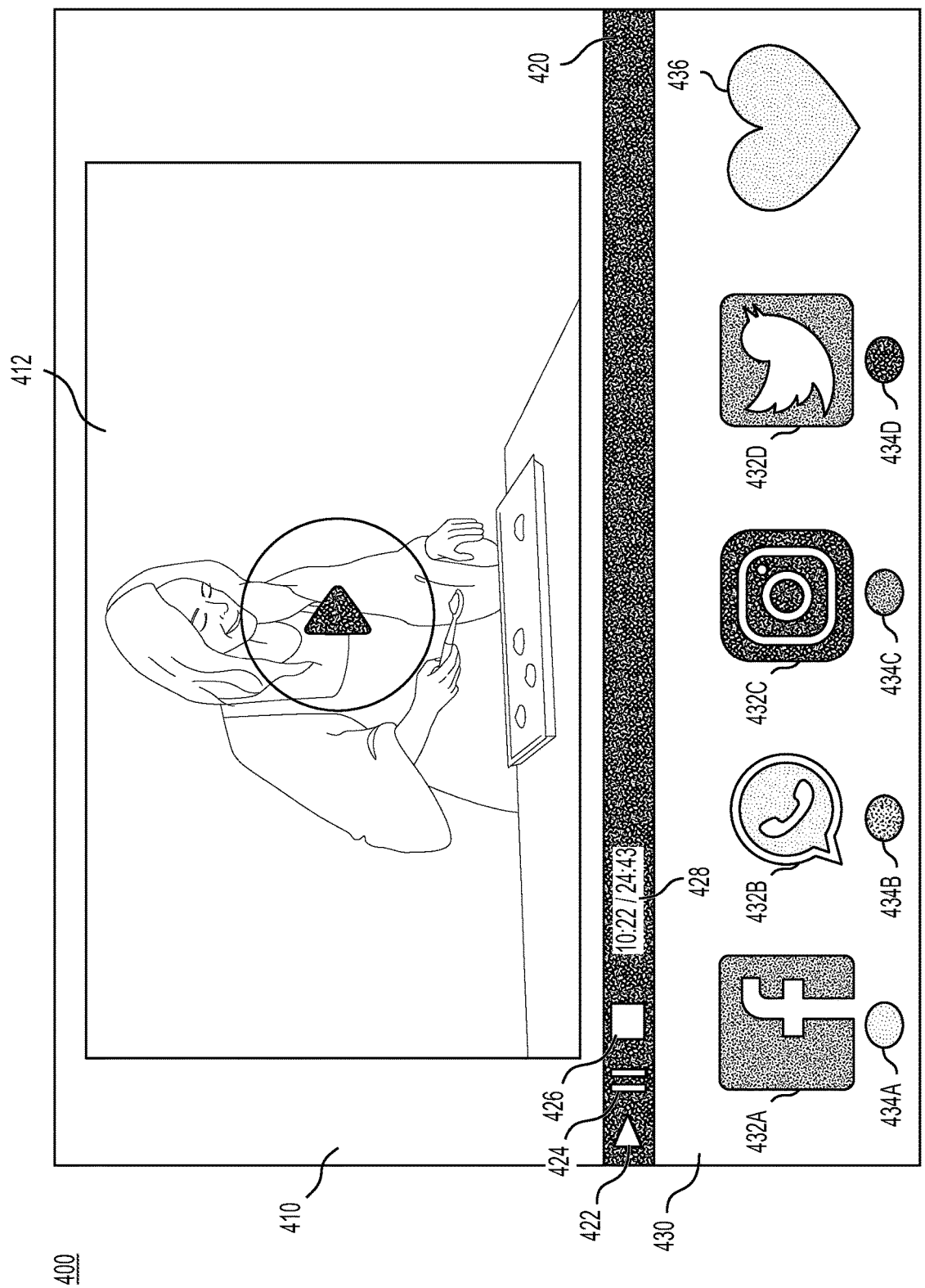
FIG. 4 depicts a user interface of an application platform associated with an exemplary media content delivery system, according to one aspect of the present disclosure.
Figure 5:
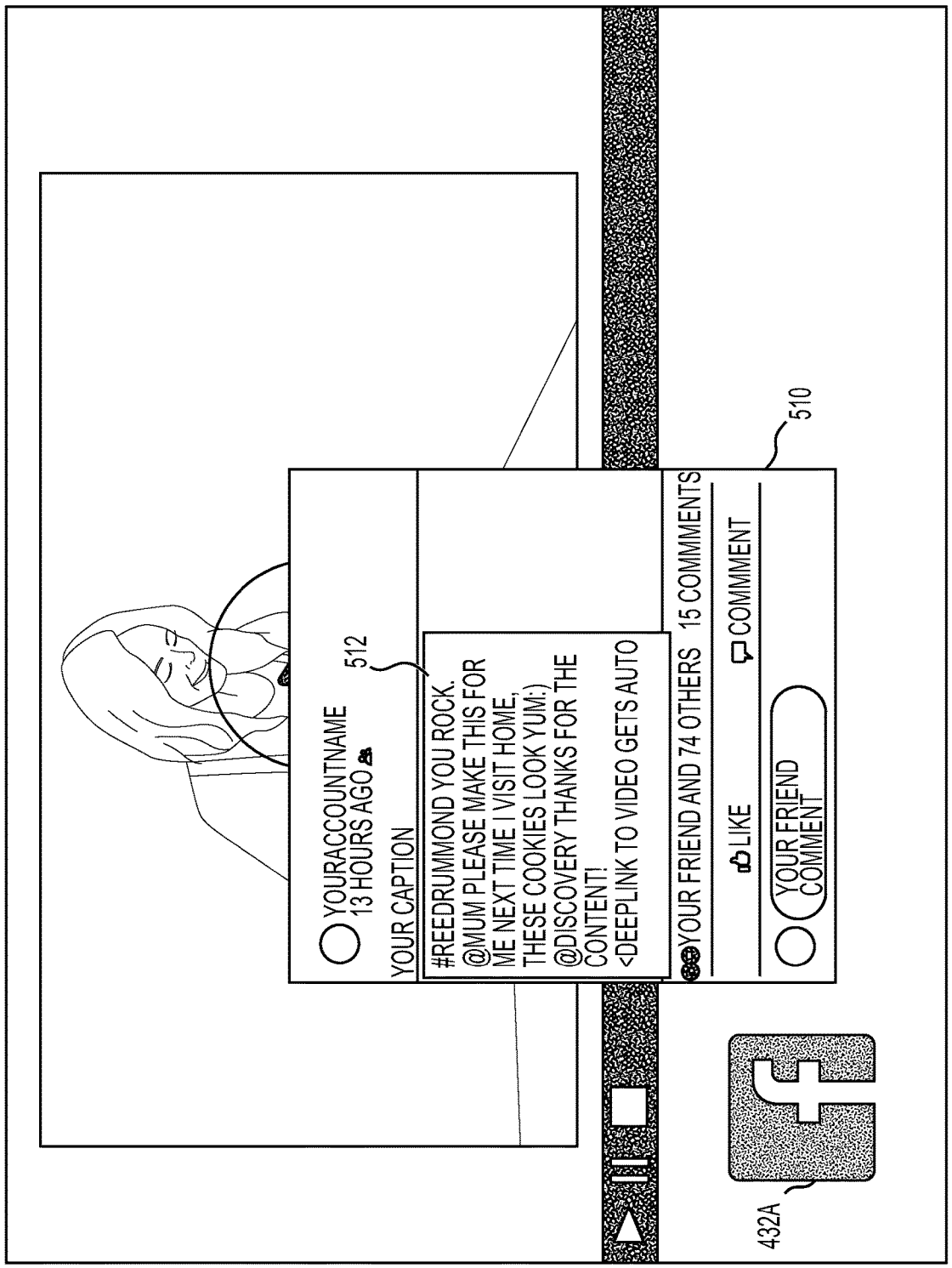
FIG. 5 depicts a user interface of an application platform associated with an exemplary media content delivery system, according to one aspect of the present disclosure.

Turning now to FIGS. 4-5, a non-limiting example implementation of the foregoing process is provided. More particularly, FIG. 4 provides an example illustration of a user interface 400 for an MSA-platform associated with the MCD system 100. The user interface 400 provides a central portion 410 on which selected media content 412 is presented. The user interface 400 may include a media content control bar 420 that contains a play button 422, a pause button 424, a stop button 426, and a content duration indicator 428. In an embodiment, the user interface 400 may additionally contain a social media portion 430. The social media portion 430 may always be present on the user interface 400 (e.g., at the bottom of the user interface 400, etc.) or, alternatively, may only be displayed on the user interface 400 in response to detection of a predetermined event (e.g., upon receipt of a user command to display the social media portion 430, upon detection of the selection of the pause button 424 or stop button 426, etc.).

Still referring to FIG. 4, in an embodiment, the social media portion 430 may contain one or more selectable social media icons (i.e., 432a, 432b, 432c, and 432d). Each of these icons 432(a-d) may be linked to a corresponding social media platform. In an embodiment, only icons associated with social media platforms that a user is signed in for may be selectable in the social media portion 430. Social media platforms that a user is not signed in to may either not appear in the social media portion 430 or, alternatively, may have their presented icon 432(a-d) made un-selectable. In an embodiment, if a user is signed into all of their social media accounts then an icon associated with each account may appear in the social media portion 430. Alternatively, an embodiment may only display a predetermined number of icons 432(a-d), the selection of which may be based on preference settings (e.g., icons associated with the four most recently used social media platforms, icons associated with the four most commonly used social media platforms, etc.).

In an embodiment, a user wishing to post content on their social media may select one or more of the presented icons 432(a-d). The selection of these icons 432(a-d) may be facilitated in one or more different ways (e.g., via touch input on the icon, mouse selection on the icon, audible input identifying the icon, etc.). Additionally or alternatively, each icon 432(a-b) may be mapped to a specific colored button on a remote control device. A button color indicator 434(a-d) that identifies the specific remote control button associated with each icon 432(a-d) may be provided on the social media portion 430. A user may select the desired icon by pressing the remote control button having the same color as the button color indicator 434(a-d). It is important to note that although FIG. 4 illustrates that button color indicators 434(a-d) are presented in the social media portion 430, such a presentation is not limiting. More particularly, the icons 432(a-d) may be mapped to other components on different selection devices and other indicators, optimized for those selection devices, may be utilized. For example, given a keyboard, each icon 432(a-d) may be mapped to a specific key on that keyboard and an indication of the mapped key may be provided at the location occupied by the button color indicators 434 (a-d). In an embodiment, Turning now to FIG. 5, a non-limiting example implementation of a user posting content to a social media account is provided. More particularly, a user of the user interface 400 in FIG. 4 may have selected social media platform 432a to post content to. Upon identification of this selection, an embodiment may, as illustrated in FIG. 5, remove the other social media icons 432(b-d) from view. Alternatively, in another embodiment (not illustrated), the selected icon(s) may be visually distinguished from the non-selected icons (e.g., via highlighting the selected icon(s), graying out the non-selected icons, etc.). In an embodiment, an input box 510 may be dynamically generated in response to the selection. The style and formatting of the input box 510 (e.g., the color scheme of the input box, the text of the input box, the interactive buttons of the input box, etc.) may resemble the style and formatting of the corresponding social media platform that input is being provided to. In an embodiment, the input box 510 may contain an input field 512 where a user may enter message content (e.g., words, emoticons, social media tags, etc.). Upon selection of a transmission option (e.g., an "enter" key, a transmission button, etc.), the entered content in the input box 510 may be transmitted and posted to a social media feed of a corresponding social media platform.

In an embodiment, in lieu of typing a new message each time a user chooses to post to social media, a user may select to post a preconfigured message. For example, referring again to FIG. 4, an auto-post option 436 is provided in the social media portion 430. A user may assign a preconfigured message to the auto-post option 436. More particularly, a user may select a particular preconfigured message (e.g., from a list of available message templates) or may construct a unique message and save it as the preconfigured message (e.g., during an initial training phase). Non-limiting examples of preconfigured messages may include: "This movie was great, check it out!", "Has anyone else watched this? What did you think?", "Does anyone have recommendations for movies or shows similar to this?", and the like. In an embodiment, subsequent to selection of one or more social media icons 432(a-d), a user may select the auto-post option 436 to post the preconfigured message on the selected social media platforms.

Referring again to FIG. 1, other individuals on the social media platform 130 may see the user's content post and choose to react to it, e.g., by providing feedback in the form of comments, likes or dislikes, emoticon responses, and the like. This feedback may be relayed back to the user on the application platform component 120 via interactions between varieties of elements in the MCD system 100. More particularly, the feedback may be originally identified and collected by a feedback service 132b of the activity module 132 of the social media platform 130. The collected feedback may then be transmitted to a feedback messaging service 114b of the social media integration module 114, which may subsequently relay indications of the feedback to a post/feedback service 118d of the presentation module 118. The post/feedback service 118d may then interface with the application platform component 120 to present the feedback to the user via the feedback element 124.

Figure 6:
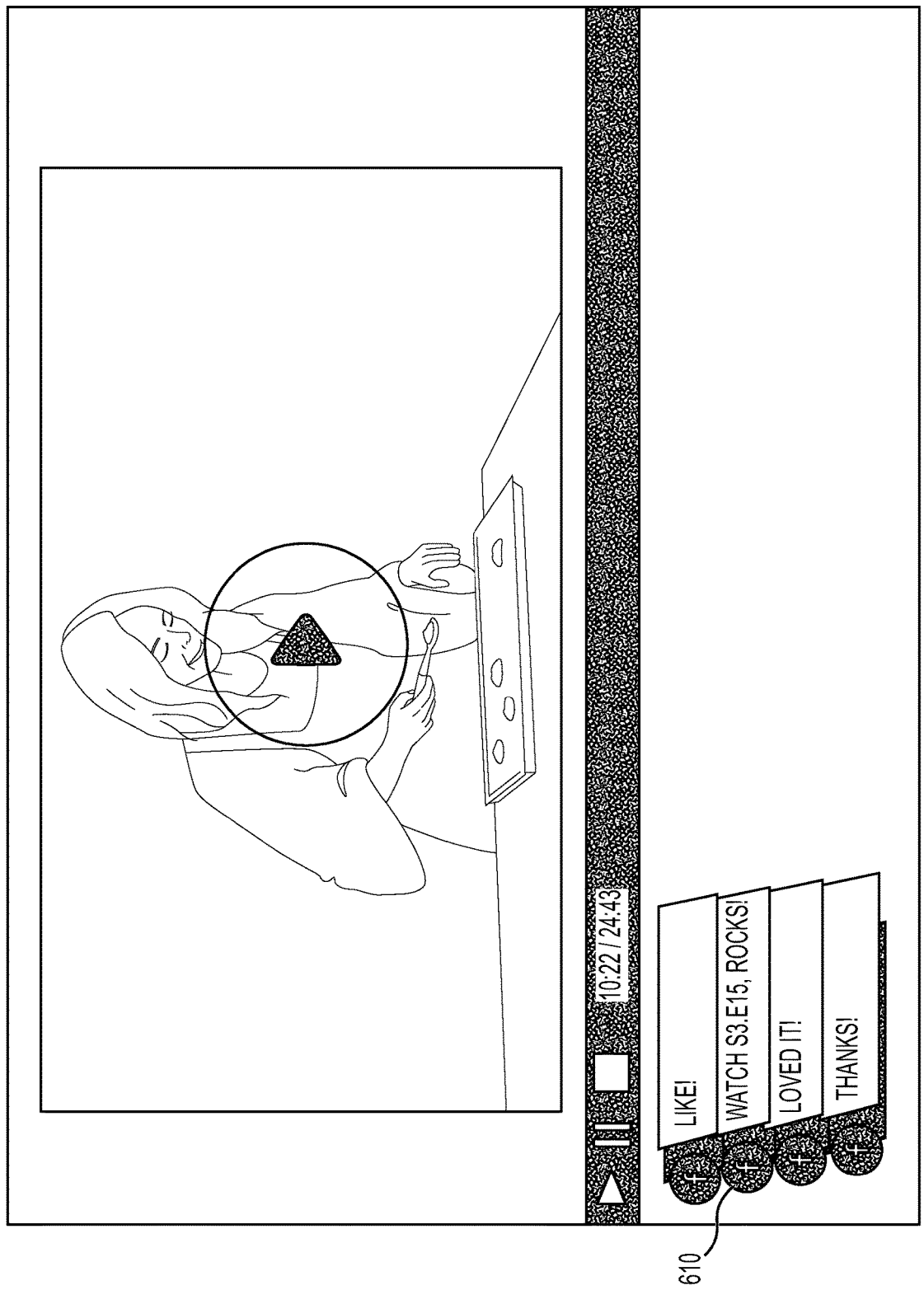
FIG. 6 depicts a user interface of an application platform associated with an exemplary media content delivery system, according to one aspect of the present disclosure.

Turning now to FIG. 6, a non-limiting example implementation of the foregoing process is provided. More particularly, FIG. 6 provides an example illustration of presenting feedback to posted content, as previously illustrated in FIGS. 4-5. Specifically, feedback 610 may be presented on the user interface 400 in the social media portion 430. If multiple reactions to content are identified, then these reactions may be grouped together/stacked, as illustrated at 610. In an embodiment, in situations where feedback is detected on two or more different social media platforms (i.e., in response to content posted on multiple platforms), then separate feedback groups (not illustrated) may exist in the social media portion 430.

Figure 7:
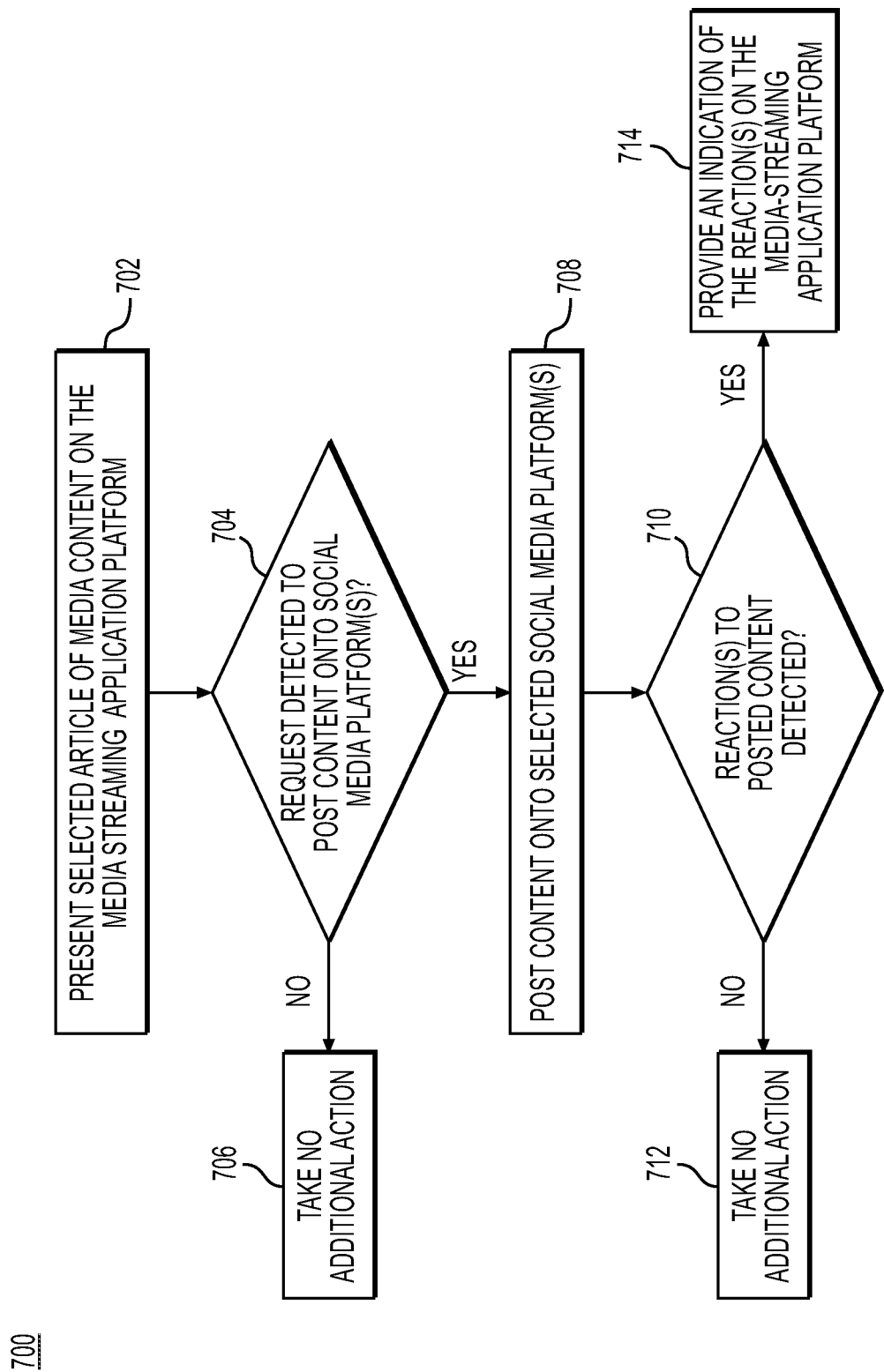
FIG. 7 illustrates a flowchart of an exemplary method of posting content on a social media platform, according to one aspect of the present disclosure.

Turning now to FIG. 7, a flowchart is illustrated of an exemplary method 700 of providing comments to a social media platform and presenting feedback to those comments. Exemplary process flows of the method 700, performed in accordance with the MCD system 100 above, and with reference to the illustrations provided in FIGS. 1-2 and 4-6, are described hereinafter.

At step 702, an embodiment may present a selected article of media content. More particularly, a user may select, from a content recommendation rail (as illustrated by 202, 204, and 206 in FIG. 2) and via one or more available selection means (e.g., touch input, stylus input, mouse input, remote control input, voice input, etc.), an article of media content to watch. Upon detecting this selection, the application platform component 120 may display the article of media content (e.g., in the central portion 410 illustrated in FIGS. 4-6) via the playback service 125.

At step 704, an embodiment may determine whether a request is detected to post content onto one or more selected social media platforms. More particularly, an embodiment may determine whether one or more icons 432(a-d) presented in the social media portion 430 were selected by a user. Responsive to determining, at step 704, that no social media icons 432(a-d) have been selected, an embodiment may, at step 706, take no additional action. Conversely, responsive to detecting, at step 706, that at least one social media icon 432(a-d) has been selected, an embodiment may, at step 708, post the content on the selected social media platforms. In an embodiment, facilitation of this posting may be carried out by various elements of the MCD system 100 (e.g., a social media posting element 122 of the application platform component 120 may transmit the content post to a post service 132a of a selected social media platform 130 via a post/feedback service 118d and a post messaging service 114c of the backend services component 110).

At step 710, an embodiment may determine whether one or more reactions to the posted content are detected. More particularly, an embodiment may determine whether other individuals on the social media platform(s) on which the content was posted have provided feedback to the posted content. Responsive to determining, at step 710, that no feedback to the posted content has been detected, an embodiment may, at step 712, take no additional action. Conversely, responsive to determining, at step 710, that at least one feedback to the posted content has been detected, an embodiment may, at step 714, provide an indication of the feedback to the user on the application platform component 120, as illustrated by 610 in FIG. 6. In an embodiment, facilitation of the feedback presentation process may be carried out by various elements of the MCD system 100 (e.g., a feedback service 132a of the social media platform 130 may transmit the feedback to a feedback element 124 of the application platform component 120 via a feedback messaging service 114b and a post/feedback service 118d of the backend services component 110).

Figure 8:
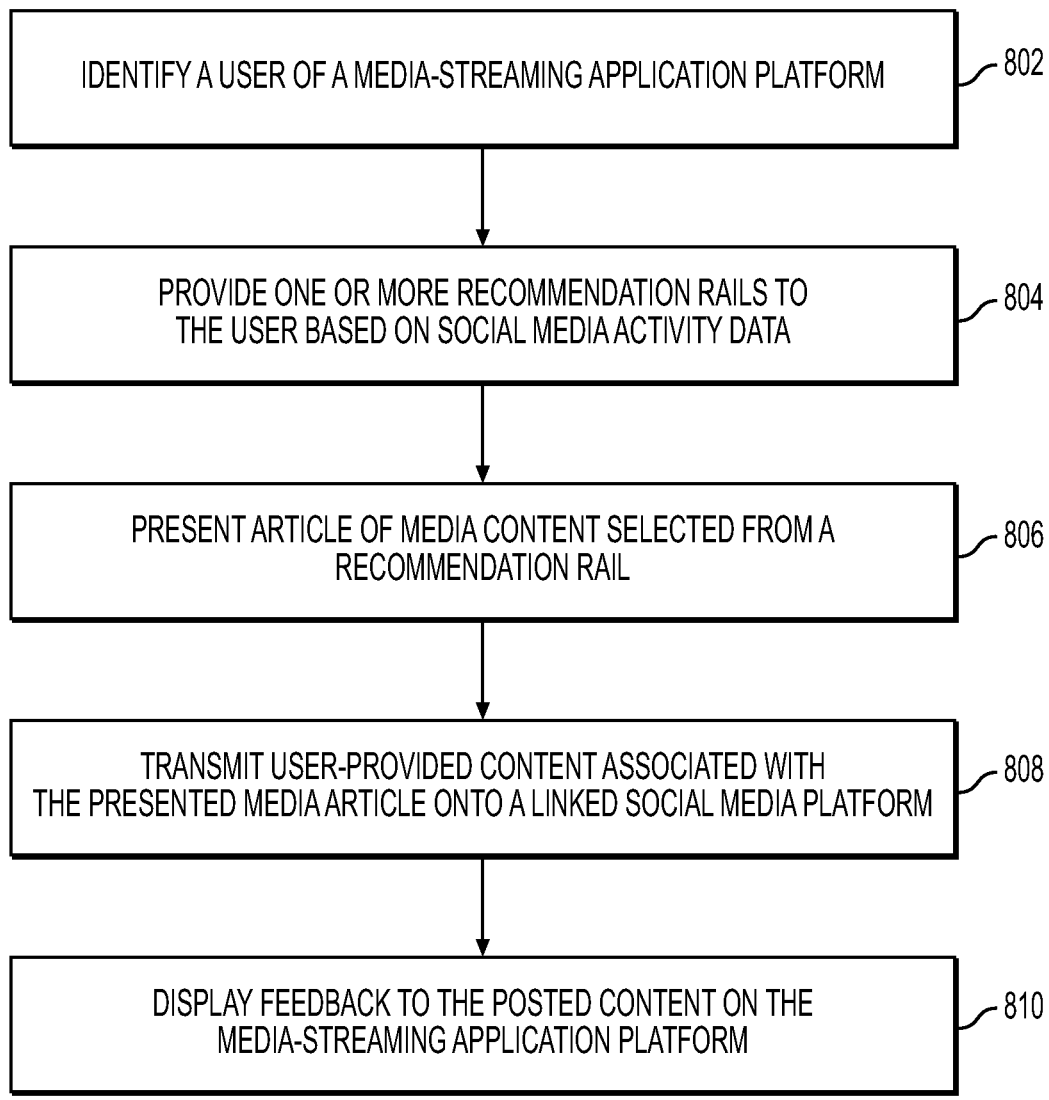
FIG. 8 illustrates a flowchart of an exemplary method of interacting with an application platform associated with a media content delivery system, according to one aspect of the present disclosure.

Turning now to FIG. 8, of an exemplary method of interacting with an application platform associated with a media content delivery system. Exemplary process flows of the method 800, performed in accordance with the MCD system 100 above, and with reference to the illustrations provided in FIGS. 2 and 4-6, are described hereinafter.

At step 802, an embodiment may identify a user of an MSA platform. The user identification process may be based upon analysis of user-provided identification input or may be conducted dynamically based upon user characteristic analysis. At step 804, an embodiment may provide one or more content recommendation rails to the user based on the collected and analyzed social media activity of others across one or more linked social media platforms. Each rail, as illustrated in FIG. 2, may be associated with a particular category and may contain one or more content recommendations associated with that category. At step 806, an embodiment may present or play a selected article of media content from a recommendation rail. At step 808, an embodiment may transmit and post user-provided content associated with the presented media article onto one or more selected social media platforms, as illustrated in FIGS. 4-5. At step 808, an embodiment may display, on the MSA platform, any feedback to the posted content.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 9:
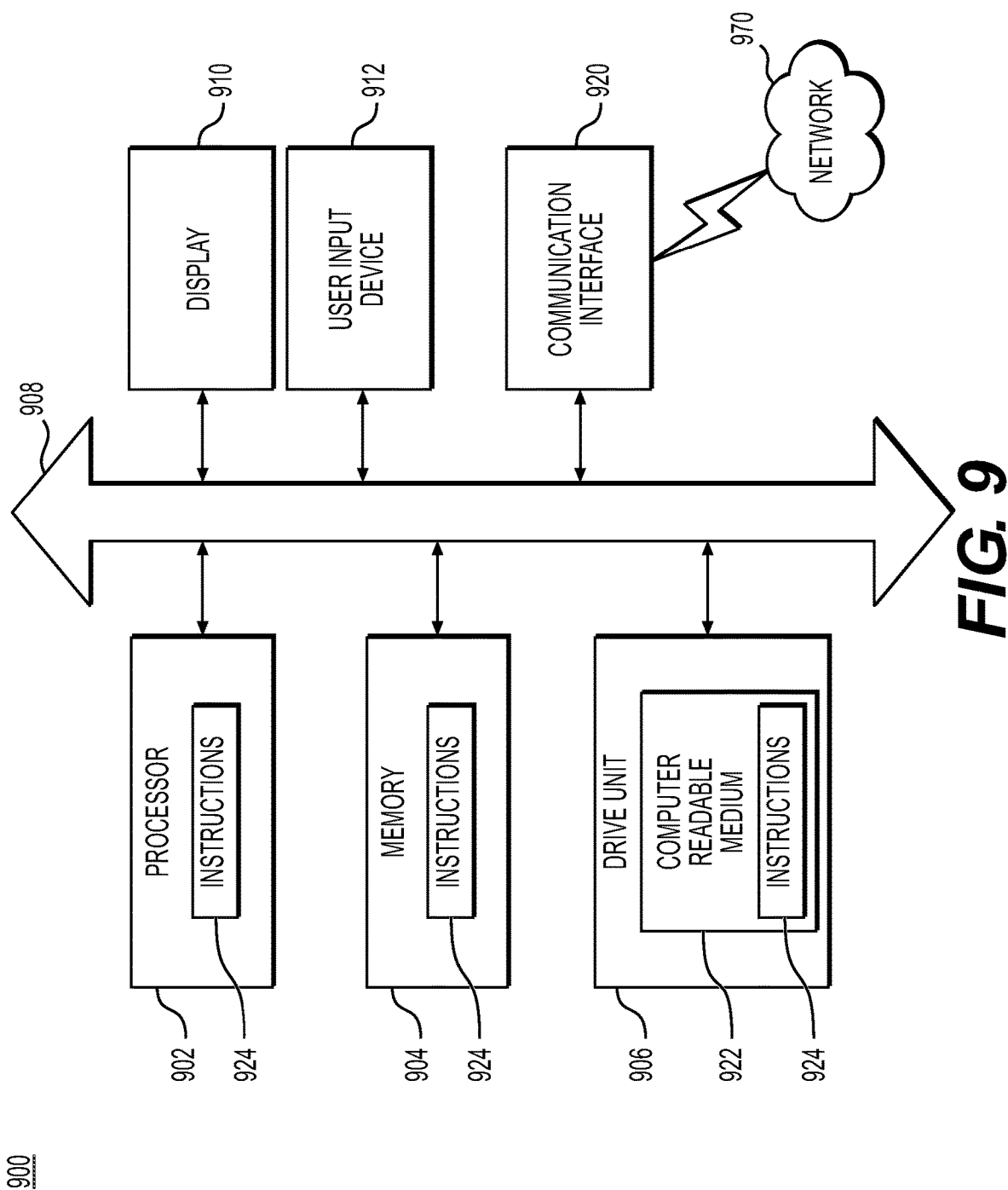
FIG. 9 illustrates a computer system for executing the techniques described herein.

FIG. 9 illustrates a computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 804 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g., software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 970 can communicate voice, video, audio, images, or any other data over the network 970. Further, the instructions 924 may be transmitted or received over the network 970 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 970, external media, the display 910, or any other components in system 900, or combinations thereof. The connection with the network 970 may be a physical connection, such as a wired Ethernet connection or may be established wirelessly as discussed below. Likewise, the additional connections with other components of the system 900 may be physical connections or may be established wirelessly. The network 970 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible. Specifically, in the context of this document, the computer readable medium is not a signal and "non-transitory" may include all media except signal media.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 970. The network 970 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 970 may include wide area networks (WAN), such as the Internet, local area networks (LAN), campus area networks, metropolitan area networks, a direct connection such as through a Universal Serial Bus (USB) port, or any other networks that may allow for data communication. The network 970 may be configured to couple one computing device to another computing device to enable communication of data between the devices. The network 970 may generally be enabled to employ any form of machine-readable media for communicating information from one device to another. The network 970 may include communication methods by which information may travel between computing devices. The network 970 may be divided into sub-networks. The sub-networks may allow access to all of the other components connected thereto or the sub-networks may restrict access between the components. The network 970 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures, and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of enabling interaction with a media-streaming application platform, the method comprising:
    identifying, utilizing user identification data, a user of the media-streaming application platform running on an information handling device;
    accessing, based on the identifying, a user profile of the user that is associated with at least one social media platform linked to the media-streaming application platform;
    obtaining, from the user profile, media-related activity data from at least one other individual associated with the user on the at least one social media platform;
    selecting, using the media-related activity data, one or more articles of media content available on the media-streaming application platform that are associated with the media-related activity data;
    presenting, on the media-streaming application platform, at least one recommendation rail comprising the one or more articles of media content;
    playing, responsive to receiving a selection from the user to view an article of media content from the one or more articles of media content on the at least one recommendation rail, the article of media content within a media-playing portion on the media-streaming application platform;
    presenting, on the media-streaming application platform and on a same page as the playing article of media content, a social media portion comprising two or more social media icons linked to corresponding social media platforms that the user is signed into, wherein the social media portion is separated from the media-playing portion on the same page of the media-streaming application platform by a media content bar that comprises one or more options for controlling playback of the article of media content and wherein the social media portion extends adjacent to the media-playing portion;
    determining, during playing of the article of media content, that at least two of the two or more social media icons are selected;
    detecting selection of an auto-post icon that is different from the at least two of the two or more social media icons, and that is positioned within the social media portion, subsequent to determining that the at least two of the two or more social media icons are selected;
    accessing a preconfigured message previously established by the user upon selection of the auto-post icon;
    transmitting the preconfigured message from the media-streaming application platform to the corresponding social media platforms that each of the selected at least two of the two or more social media icons are linked to; and
    providing, to the user on the media-streaming platform and subsequent to the preconfigured message being transmitted onto the corresponding social media platforms, at least one reaction event to the preconfigured message from one or more subscribers of at least one of the corresponding social media platforms.

2. The method of claim 1, wherein the at least one other individual is associated with the user on the social media platform via a designation selected from the group consisting of: a family member, a friend, and a social media group member.

3. The method of claim 1, wherein the at least one recommendation rail comprises a plurality of recommendation rails and wherein each of the plurality of recommendation rails is associated with a unique recommendation category.

4. The method of claim 1, wherein the detecting comprises detecting an input selection from a remote control device, wherein each of the at least one social media platform is mapped to a button on the remote control device and wherein a visual indication of the mapping is presented on the media-streaming application platform.

5. The method of claim 1, wherein each of the at least one reaction events comprises an emoji, a like indication or a dislike indication, and/or a comment.

6. The method of claim 1, wherein an indication of the preconfigured message and the at least one reaction event is displayed concurrently on the media-streaming platform on the same page as the playing article of media content.

7. The method of claim 1, wherein the social media portion is presented on the same page as the playing article of media content in response to detection of a predetermined event associated with playing of the article of media content.

8. The method of claim 1, wherein the two or more social media icons are associated with a corresponding subset of recently utilized social media platforms from the corresponding social media platforms.

9. The method of claim 1, wherein the one or more options comprise at least one of: a play button, a pause button, and a stop button.

10. The method of claim 1, wherein one or more visual characteristics of the at least one reaction event are configured to match an appearance of the corresponding social media platform.

11. An information handling device, comprising:
    one or more computer readable media storing instructions for interacting with a media-streaming application platform; and
    one or more processors configured to execute the instructions to perform operations comprising:
    identifying, utilizing user identification data, a user of the media-streaming application platform running on the information handling device;
    accessing, based on the identifying, a user profile of the user that is associated with at least one social media platform linked to the media-streaming application platform;
    obtaining, from the user profile, media-related activity data from at least one other individual associated with the user on the at least one social media platform;
    selecting, using the media-related activity data, one or more articles of media content available on the media-streaming application platform that are associated with the media-related activity data;
    presenting, on the media-streaming application platform, at least one recommendation rail comprising the one or more articles of media content;
    playing, responsive to receiving a selection from the user to view an article of media content from the one or more articles of media content on the at least one recommendation rail, the article of media content on a media-playing portion of the media-streaming application platform;
    presenting, on the media-streaming application platform and on a same page as the playing article of media content, a social media portion comprising two or more social media icons linked to corresponding social media platforms that the user is signed into, wherein the social media portion is separated from the media-playing portion on the same page of the media-streaming application platform by a media content bar that comprises one or more options for controlling playback of the article of media content and wherein the social media portion extends adjacent to the media-playing portion;

determining, during playing of the article of media content, that at least two of the two or more social media icons are selected;

detecting selection of an auto-post icon that is different from the two or more social media icons, and that is positioned within the social media portion, subsequent to determining that the at least two of the two or more social media icons are selected;

accessing a preconfigured message previously established by the user upon selection of the auto-post icon;

transmitting the preconfigured message from the media-streaming application platform to the corresponding social media platforms that each of the selected at least two of the two or more social media icons are linked to; and providing, to the user on the media-streaming platform and subsequent to the preconfigured message being transmitted onto the corresponding social media platforms, at least one reaction event to the preconfigured message from one or more subscribers of at least one of the corresponding social media platforms.

12. The information handling device of claim 11, wherein the at least one recommendation rail comprises a plurality of recommendation rails and wherein each of the plurality of recommendation rails is associated with a unique recommendation category.

13. The information handling device of claim 11, wherein the operations to detect further comprise:

detecting an input selection from a remote control device, wherein each of the at least one social media platform is mapped to a button on the remote control device and wherein a visual indication of the mapping is presented on the media-streaming application platform.

14. The information handling device of claim 11, wherein each of the at least one reaction events comprises an emoji, a like indication or a dislike indication, and/or a comment.

15. The information handling device of claim 11, wherein an indication of the preconfigured message and the at least one reaction event is displayed concurrently on the media-streaming platform on the same page as the playing article of media content.

16. The information handling device of claim 11, wherein the social media portion is presented on the same page as the playing article of media content in response to detection of a predetermined event associated with playing of the article of media content.

17. The information handling device of claim 11, wherein the two or more social media icons are associated with a corresponding subset of recently utilized social media platforms from the corresponding social media platforms.

18. The information handling device of claim 11, wherein the one or more options comprise at least one of: a play button, a pause button, and a stop button.

19. The information handling device of claim 11, wherein one or more visual characteristics of the at least one reaction event are configured to match an appearance of the corresponding social media platform.

20. A non-transitory computer-readable medium storing instructions for interacting with a media-streaming application platform, the instructions, when executed by one or more processors, causing the one or more processors to perform operations comprising:

identifying, utilizing user identification data, a user of the media-streaming application platform;

accessing, based on the identifying, a user profile of the user that is associated with at least one social media platform linked to the media-streaming application platform;

obtaining, from the user profile, media-related activity data from at least one other individual associated with the user on the at least one social media platform;

selecting, using the media-related activity data, one or more articles of media content available on the media-streaming application platform that are associated with the media-related activity data;

presenting, on the media-streaming application platform, at least one recommendation rail comprising the one or more articles of media content;

playing, responsive to receiving a selection from the user to view an article of media content from the one or more articles of media content on the at least one recommendation rail, the article of media content on a media-playing portion of the media-streaming application platform;

presenting, on the media-streaming application platform and on a same page as the playing article of media content, a social media portion comprising two or more social media icons linked to corresponding social media platforms that the user is signed into, wherein the social media portion is separated from the media-playing portion on the same page of the media-streaming application platform by a media content bar that comprises one or more options for controlling playback of the article of media content and wherein the social media portion extends adjacent to the media-playing portion;

determining, during playing of the article of media content, that at least two of the two or more social media icons are selected;

detecting selection of an auto-post icon that is different from the two or more social media icons, and that is positioned within the social media portion, subsequent to determining that the at least two of the two or more social media icons are selected;

accessing a preconfigured message previously established by the user upon selection of the auto-post icon;

transmitting the preconfigured message from the media-streaming application platform to the corresponding social media platforms that each of the selected at least two of the two or more social media icons are linked to; and providing, to the user on the media-streaming platform and subsequent to the preconfigured message being transmitted onto the corresponding social media platforms, at least one reaction event to the preconfigured message from one or more subscribers of at least one of the corresponding social media platforms.

* * * * *